No. 12,055. Reissued Nov. 18, 1902.

P. L. KIMBALL.

LIQUID SEPARATOR.

(Application filed Oct. 24, 1902.)

WITNESSES:

C. F. Kilgore

H. Kreimendahl

INVENTOR.

Perley L. Kimball

By Simonds & Hart

ATTORNEYS

UNITED STATES PATENT OFFICE.

PERLEY L. KIMBALL, OF BELLOWS FALLS, VERMONT, ASSIGNOR TO THE VERMONT FARM MACHINE COMPANY, OF BELLOWS FALLS, VERMONT, A CORPORATION OF VERMONT.

LIQUID-SEPARATOR.

SPECIFICATION forming part of Reissued Letters Patent No. 12,055, dated November 18, 1902.

Original No. 565,279, dated August 4, 1896. Application for reissue filed October 24, 1902. Serial No. 128,674.

*To all whom it may concern:*

Be it known that I, PERLEY L. KIMBALL, a citizen of the United States of America, residing at Bellows Falls, in the county of Windham and State of Vermont, have invented a certain new and useful Improvement in Centrifugal Machines for Separating Liquids of Different Densities and Specially Adaptable to the Separation of Cream from New Milk, of which the following is a description, reference being had to the accompanying drawings, wherein—

Figure 1:
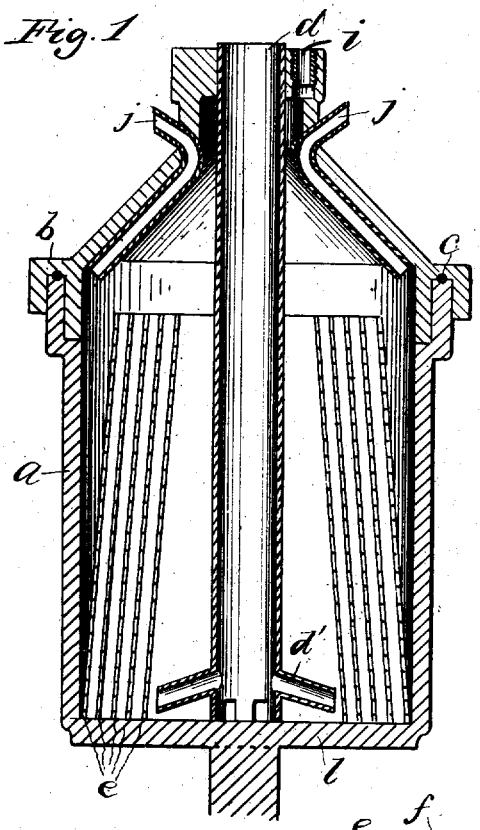
Figure 2:
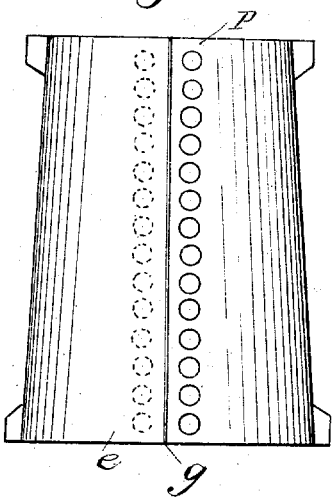
Figure 3:
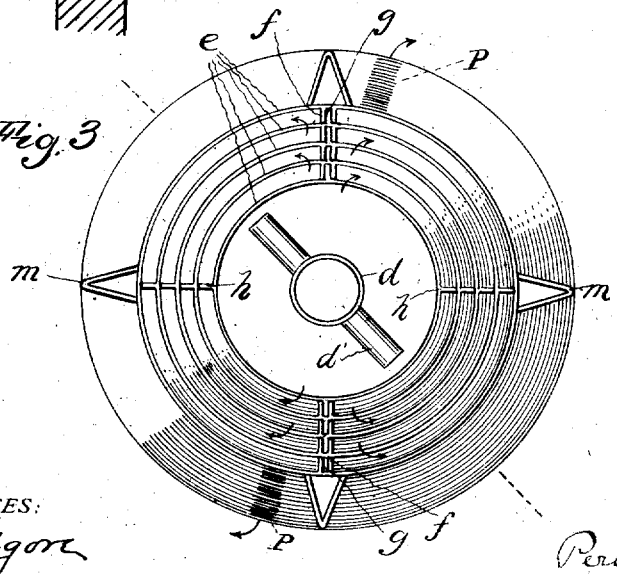

Figure 1 is a view in central vertical section of a separator embodying said improvement. Fig. 2 is a side view of one of the circular partitions made use of—the one next the outermost. Fig. 3 is a top or plan view of the nest or set of circular partitions contained within the separator-drum on a somewhat-enlarged scale. The arrows indicate the course of the milk through the openings in the circular partitions from one canal to another.

The mechanism is described herein as applied to the separation of cream from new milk.

The letter *a* denotes the swiftly-rotating separator-drum, *b* a cover screwing upon the same, and *c* a packing-ring between the two. The new or whole milk enters through the feed-pipe *d* and escapes therefrom through tubes *d'*. Under centrifugal action the heavier portions of the whole milk—the watery constituents—tend to seek the inner wall of the drum *a* and in so doing tend to force the cream into a central mass. In this machine the liquid in order to reach the inner wall of the drum must travel a zigzag course through canals formed between the circular partitions, the liquid passing from one such canal to another through openings made for that purpose in such circular partitions.

The letter *e* depotes such circular partitions one within the other. To the inner wall of each of these circular partitions, except the innermost one, there is attached at opposite parts of the circle a groove *f*, reaching from top to bottom of the partition. At corresponding positions on the outer wall of the next inner circular partition there are attached blades *g* from top to bottom, which fit and run in the grooves *f*. By means of this arrangement of "ways" the circular partitions fit to and within one another and are separable and detachable from each other, a construction which facilitates manufacture, assembly, and cleaning. At points intermediate of these ways there are projections or stays *h* fast on the outer walls of the circular partitions for the purpose of steadying them in place with reference to each other. The ways just described also act as stop-walls in the canals, which exist between the circular partitions, so that such canals do not permit the liquid to travel the entire circle. Next each of these stop-walls there is a vertical line of holes *p* through the circular partitions, which form openings for the passage of the liquid first into the innermost of the canals and then successively into and through the others until the liquid reaches the inner wall of the drum *a*. The arrows in Fig. 3 show the location of these openings and indicate the course of the liquid. Such openings in one partition are out of alinement with the similar openings in the two partitions next adjacent on either side.

In the plan view, Fig. 3, the vertical line of openings in the outermost partition appears on the inclined wall of the partition, as shown at *p p*. The arrows at those points indicate the course of the milk through the whole line of vertical apertures as it emerges through the outermost partition into the space separating the latter from the wall of the drum.

While the milk is yet in the central space, separation of the cream from the more watery constituents of the milk takes place to a very considerable degree and the cream collects into a central mass. While the milk is traveling through the canals the heavier constituents constantly seek the outer wall of the canal in which the liquid then is, forcing the cream against the inner wall of that canal, along which it rises, escapes at the open upper end, and then joins the central cream mass. It passes out of the separator through the cream-outlet *i*. The watery part, generally called the "blue milk," reaching the inner wall of the separator-drum passes out of the separator through the blue-milk outlets *j*, more or less in number.

The assembled set or nest of circular partitions either rest directly on the floor of the separator or the lower end of the same may be provided with a removable cap *l*. The wings *m* on the outermost wall of the outermost circular partition assist in making the liquid rotate with the separator-drum. The entire nest of the partitions is readily lifted out of the drum *a* when the cover *b* is taken off.

I claim as my improvement—

1. In a centrifugal separator adapted and designed for separating mixed fluids of different specific gravities and delivering the whole from the separating vessel in two separated products in fluid form, the combination of a revoluble vessel; an inlet for the mixed and unseparated fluids; a single outlet from said vessel for a lighter separated product situated above the hereinafter-mentioned partitions; a plurality of circular, continuous, concentric, slightly conical partitions all surrounding a central separating-chamber and all adapted to deliver the lighter constituent to a common massing space next said outlet—one within the other and all convergent substantially in the same direction, having openings through the same for the passage of the liquid, such openings in one partition out of alinement with the openings of the next adjacent partition.

2. In a centrifugal separator, the circular, continuous, concentric, slightly-conical partitions one within the other, non-alined openings through them for the passage of the liquid and stop-walls from one partition to another, all combined and constructed substantially as described and for the purposes set forth.

3. In a centrifugal separator, the circular continuous, concentric, slightly-conical partitions one within the other and all convergent substantially in the same direction having non-alined openings through them for the passage of the liquid and separable from each other, all substantially as described and for the purposes set forth.

4. In a centrifugal separator, the circular continuous, concentric, slightly-conical partitions one within the other, detachable from each other and sliding upon each other in ways, all substantially as described and for the purposes set forth.

PERLEY L. KIMBALL.

Witnesses:
A. L. HAINES,
H. W. LADD.